(12) United States Patent
Yanagi et al.

(10) Patent No.: US 11,006,061 B2
(45) Date of Patent: May 11, 2021

(54) IMAGE CORRECTION METHOD AND IMAGE CAPTURE DEVICE

(71) Applicant: HITACHI KOKUSAI ELECTRIC INC., Tokyo (JP)

(72) Inventors: Tadaaki Yanagi, Tokyo (JP); Kazuhiko Nakamura, Tokyo (JP); Kentaro Suguro, Tokyo (JP); Kazuyoshi Sato, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 71 days.

(21) Appl. No.: 16/322,281

(22) PCT Filed: Jun. 12, 2017

(86) PCT No.: PCT/JP2017/021623
§ 371 (c)(1),
(2) Date: Mar. 1, 2019

(87) PCT Pub. No.: WO2018/029972
PCT Pub. Date: Feb. 15, 2018

(65) Prior Publication Data
US 2019/0191115 A1 Jun. 20, 2019

(30) Foreign Application Priority Data
Aug. 8, 2016 (JP) .............................. JP2016-155897

(51) Int. Cl.
*H04N 5/365* (2011.01)
(52) U.S. Cl.
CPC ........... *H04N 5/365* (2013.01); *H04N 5/3655* (2013.01)
(58) Field of Classification Search
CPC ........ H04N 5/357; H04N 5/361; H04N 5/365; H04N 5/3651; H04N 5/3655
See application file for complete search history.

(56) References Cited

U.S. PATENT DOCUMENTS

| 2002/0085112 A1 | 7/2002 | Hiramatsu et al. |
| 2003/0214590 A1* | 11/2003 | Matherson ............. H04N 5/361 348/243 |
| 2018/0098011 A1* | 4/2018 | Furuta .................... G01J 1/0411 |

FOREIGN PATENT DOCUMENTS

| JP | 2001-326851 A | 11/2001 |
| JP | 2013-207788 A | 10/2013 |
| JP | 2015-100099 A | 5/2015 |

OTHER PUBLICATIONS

International Search Report dated Aug. 29, 2017.

* cited by examiner

*Primary Examiner* — Daniel M Pasiewicz
(74) *Attorney, Agent, or Firm* — Bacon & Thomas, PLLC

(57) ABSTRACT

In an image correction method and an image capture device, a one-frame addition average calculation unit calculates a one-frame addition average value. If the one-frame addition average value falls within an appropriate range, a determination circuit inputs image data for one frame to an adder and the adder adds the image data to a cumulative correction value to update the correction value. The updated correction value is stored in a frame memory. If the one-frame addition average value is outside the appropriate range, the image data for one frame is discarded. After updating the cumulative correction value until the number of updates reaches a prescribed number, an FPN correction value is calculated by dividing the cumulative correction value stored in the frame memory by the prescribed number, and an image is corrected by subtracting the FPN correction value from the image data inputted at the time of imaging.

4 Claims, 5 Drawing Sheets

CONFIGURATION OF IMAGE CAPTURE DEVICE

CONFIGURATION OF FPN CORRECTION UNIT IN CONVENTIONAL IMAGE CAPTURE DEVICE

IMAGE CORRECTION METHOD AND IMAGE CAPTURE DEVICE

TECHNICAL FIELD

The present invention relates to an image correction method and an image capture device and, more particularly, to an image correction method and an image capture device capable of obtaining a high-quality image by suppressing the influence of sudden frame fluctuation at the time of calculating a correction value and precisely removing fixed pattern noise.

BACKGROUND ART

Description of Prior Art

Noise contained in an image signal acquired from an image capture device includes random noise that fluctuates over time and fixed pattern noise (FPN) that does not fluctuate over time.

Since the random noise has no regularity, it is difficult to suppress noise on an image signal without degrading a resolution and an image quality. For the sake of improvement, it is necessary to improve the performance of an imaging element itself.

On the other hand, the FPN can be eliminated or suppressed by signal processing based on its regularity.

Specifically, in an FPN correction unit of an image capture device, FPN is extracted from an image signal at the time of light shielding and is stored as a correction value. The correction value is subtracted from an actual image signal, thereby outputting a corrected image signal from which the FPN is removed.

(Configuration of Conventional Image Capture Device: FIG. 5)

An FPN correction unit in a conventional image capture device will be described with reference to FIG. 5. FIG. 5 is a configuration block diagram of an FPN correction unit in a conventional image capture device.

As shown in FIG. 5, the FPN correction unit (conventional FPN correction unit) of the conventional image capture device includes a black level subtraction unit 51, an addition unit 52, a first line buffer 53, a memory controller 54, a DDR (Double Data Rate) frame memory 55, a second line buffer 56, a divider 57 and a subtracter 58.

Each part of the conventional FPN correction unit will be described. The level subtraction unit 51 subtracts a reference black level from an input image signal at the time of light shielding.

The addition unit 52 adds the light shielding time image data, which is acquired from the black level subtraction unit 51, to a cumulative correction value accumulated in and read from the DDR frame memory 55, for each pixel.

The first line buffer 53 holds the output from the addition unit 52 for one row (one line) and outputs it to the memory controller 54.

The DDR frame memory 55 stores the cumulative correction value for one frame in association with each pixel. Incidentally, the cumulative correction value stored in the DDR frame memory 55 becomes a provisional value until the corrected value calculation processing is completed.

The memory controller 54 updates the cumulative correction value stored in the DDR frame memory 55 using the added value outputted from the first line buffer 53. In addition, the memory controller 54 reads out the cumulative correction value stored in the DDR frame memory 55 and outputs it to the second line buffer 56.

Specifically, the memory controller 54 receives the data of the cumulative correction value on a row-by-row basis from the first line buffer 53 and writes the data into the DDR frame memory 55 on a line-by-line basis. Then, the output from the first line to the line buffer 56 is performed in conformity with the timing at which the data of the next frame is outputted to the addition unit 52. The writing and reading into and from the DDR frame memory 55 may be performed in parallel.

The second line buffer 56 holds the read cumulative correction value for one row and outputs it to the addition unit 52 for each pixel.

The divider 57 divides the cumulative correction value for each pixel read from the DDR frame memory 55 by a specified number of times (k).

The specified number of times is the number of frames necessary for calculating the cumulative correction value and may be, for example, 256 times. When the cumulative correction value calculation process is completed, the cumulative correction value stored in the DDR frame memory is added with the output from the black level subtracter 51 by a specified number of times.

That is, the output from the divider 57 is an average level at the time of light shielding that reflects the fixed pattern noise at each pixel, and is the FPN correction value for correcting the fixed pattern noise of each pixel.

The subtracter 58 subtracts the output of the divider 57 for each pixel from the image data inputted at the time of image capture, removes the fixed pattern noise, and outputs the corrected image data.

(Conventional Image Correction Method: FIG. 5)

An image correction method performed in the FPN correction unit of the conventional image capture device shown in FIG. 5 will be described.

In the conventional image capture device, the image data at the time of light shielding is inputted in order to perform a correction value calculation process, and the black level is subtracted by the black level subtraction unit 51.

On the other hand, the cumulative correction value stored at that point in the DDR frame memory 55 is read out by the memory controller 54 and is inputted to the addition unit 52 via the line buffer 56. The image data from the black level subtracter 51 and the cumulative correction value are added in the addition unit 52, and the added cumulative correction value is stored in the DDR frame memory 55 by the memory controller 54 via the line buffer 53, whereby the cumulative correction value is updated.

Further, the memory controller 54 holds the number of additions obtained by adding the image data to the cumulative correction value, increments the number of additions each time when the cumulative correction value is updated, inputs the light-shielded image data until the number of additions reaches a specified (predetermined) number of times (k times), and continues to update the cumulative correction value.

When the number of additions reaches the specified number of times, the process of calculating the correction value is completed, and the process is shifted to image capture.

At the time of image capture, the cumulative correction value read out from the DDR frame memory 55 is divided by the specified number of times k in the divider 57 to calculate an FPN correction value for each pixel. In the subtracter 58, the output of the divider 57 is subtracted from the inputted image data of each pixel to output corrected image data.

In this way, the conventional image correction method is performed.

(Influence of Sudden Level Fluctuation)

An addition averaging circuit is often used for extraction of FPN (generation of an FPN correction value). Since a frame circuit is used for addition averaging, a constraint on memory capacity occurs.

Furthermore, the relationship between the attenuation factor of a random noise component and the number of additions (k) is represented by equation (1).

$$S/N \text{ (dB)} = 20 * \log_{10}(1/\sqrt{k}) \qquad (1)$$

That is, as the number of additions increases, the random noise component decreases.

However, if there is an unexpected frame fluctuation at the time of light shielding, the noise directly becomes a direct current component. Thus, a fluctuation in level occurs, which affects the FPN correction value.

Related Art

As a technique for removing fixed pattern noise in an image capture device, there is available Japanese Patent Application Publication No. 2015-100099 entitled "image capture device and fixed pattern noise removal method" (Japan Broadcasting Corporation and Hitachi Kokusai Electric, Inc.) (Patent Document 1). Patent Document 1 describes that dark FPN and bright FPN are removed from an image signal to obtain a true signal value, thereby outputting a highly accurate image signal.

However, in the conventional image correction method and the conventional image capture device, when an unexpected frame fluctuation occurs at the time of generating an FPN correction value, there is a problem that the correction value is affected and the highly accurate correction of fixed pattern noise cannot be performed with respect to the image at the time of image capture.

Patent Document 1 does not describe that one-frame addition average value is calculated with respect to image data at the time of light shielding and, if one-frame addition average value is out of an appropriate range, the frame is not used for calculation of an FPN correction value.

SUMMARY OF THE INVENTION

The present invention has been made in view of the above circumstances. It is an object of the present invention to provide an image correction method and an image capture device capable of suppressing the influence of sudden frame fluctuation, correcting fixed pattern noise with high accuracy and outputting a high-quality image.

In accordance with an aspect of the present invention, there is provided an image correction method performed in an image capture device, which comprises: inputting an image signal at the time of light shielding, holding image data for one frame and calculating one-frame addition average value with respect to the image data; if the one-frame addition average value falls within a preset range, adding the image data for one frame to a cumulative correction value which is cumulatively added image data, updating the cumulative correction value and storing the cumulative correction value in a frame memory; and after the update of the cumulative correction value is performed a specified number of times, dividing the cumulative correction value stored in the frame memory by the specified number of times to obtain a correction value, subtracting the correction value from image data inputted at the time of image capture and correcting an image.

In accordance another aspect of the present invention, there is provided an image correction method performed in an image capture device, which comprises: inputting an image signal at the time of light shielding, holding image data for one frame and calculating a one-frame addition average value with respect to the image data; subtracting the one-frame addition average value from the held image data to calculate a difference; cumulatively adding the differences, updating a cumulative difference value and storing the updated cumulative difference value in a frame memory; calculating an addition average of all the calculated one-frame addition average values as an all-frame addition average value; and after the update of the cumulative difference value is performed a specified number of times, adding a value obtained by dividing the cumulative difference value by the specified number of times to the all-frame addition average value to obtain a correction value, subtracting the correction value from image data inputted at the time of image capture and correcting an image.

In accordance still another aspect of the present invention, there is provided an image capture device for correcting an image with respect to an inputted image signal, which comprises: a frame memory configured to store image data for one frame at the time of light shielding and a cumulative correction value which is cumulatively added image data; a memory controller configured to control input/output to/from the frame memory; a one-frame addition average calculation unit configured to calculate a one-frame addition average value with respect to the image data for one frame; an adder configured to add the cumulative correction value and the image data for one frame; a switch configured to switch input/non-input of the image data for one frame to the adder; a determination circuit configured to perform a determination process of determining whether or not the one-frame addition average value falls within a preset range, switching the switch to an input side when the one-frame addition average value falls within the preset range, and switching the switch to an non-input side when the one-frame addition average value is outside the preset range; a divider configured to calculate a correction value by dividing the cumulative correction value by a specified number of times; and a subtracter configured to subtract the cumulative correction value from image data inputted at the time of image capture to correct an image, wherein the memory controller outputs the image data for one frame from the frame memory to the switch, outputs the cumulative correction value to the adder, updates the cumulative correction value stored in the frame memory using an addition result in the adder, performs the update of the cumulative correction value a specified number of times, and outputs the cumulative correction value to the divider.

The determination circuit may store a first threshold value as a lower limit value of the one-frame addition average value and a second threshold value as an upper limit value of the one-frame addition average value, and determine that the one-frame addition average value falls within the preset range when the one-frame addition average value from the one-frame addition average calculation unit is equal to or larger than the first threshold value and equal to or smaller than the second threshold value.

In accordance further still another aspect of the present invention, there is provided an image capture device for correcting an image with respect to an inputted image signal, which comprises: a frame memory configured to store image data for one frame at the time of light shielding and a cumulative correction value used for calculation of a correction value for correcting an image; a memory controller configured to control input/output to/from the frame memory; a one-frame addition average calculation unit configured to calculate a one-frame addition average value with respect to the image data for one frame; a first subtracter configured to subtract the one-frame addition average value from the image data for one frame; a first adder configured to add the cumulative difference value and a subtraction result in the first subtracter; a divider configured to divide the cumulative difference value by a specified number of times; an all-frame addition average calculation unit configured to calculate an addition average of the one-frame addition average values for the specified number of times as an all-frame addition average value; a second adder configured to add the all-frame addition average value and the division result of the divider; and a second subtracter configured to subtract the addition result of the second adder from image data inputted at the time of image capture to correct the image, wherein the memory controller outputs the image data for one frame from the frame memory to the first subtracter, outputs the cumulative difference value to the first adder, updates the cumulative difference value stored in the frame memory using the addition result in the first adder, performs the update of the cumulative difference value a specified number of times, and outputs the cumulative difference value to the divider.

Effects of the Invention

According to the present invention, in the image correction method performed in the image capture device, the image signal at the time of light shielding is inputted. The image data for one frame is held and one-frame addition average value for image data is calculated with respect to the image data. If the one-frame addition average value is within a preset range, the image data for one frame is added to the cumulative correction value which is cumulatively added image data. The cumulative correction value is updated and stored in the frame memory. After the cumulative correction value is updated a specified number of times, the cumulative correction value stored in the frame memory is divided by the specified number of times to obtain a correction value. The correction value is subtracted from the image data inputted at the time of image capture, thereby correcting the image. Therefore, there is an effect that it is possible to calculate a correction value with high accuracy by eliminating the influence of sudden frame fluctuation when calculating the correction value of fixed pattern noise and it is possible to output a high-quality image at the time of image capture.

Furthermore, according to the present invention, in the image correction method performed in the image capture device, the image signal at the time of light shielding is inputted. The image data for one frame is held and one-frame addition average value for image data is calculated with respect to the image data. A difference is calculated by subtracting one-frame addition average value from the held image data. The difference is cumulatively added. The cumulative difference value is updated and stored in the frame memory. The addition average of all the calculated one-frame addition average values is calculated as an all-frame addition average value. After the cumulative difference value is updated a specified number of times, a value obtained by dividing the cumulative difference value by the specified number of times is added to the all-frame addition average value to obtain a correction value. The correction value is subtracted from the image data inputted at the time of image capture to correct the image. Therefore, there is an effect that it is possible to calculate a correction value with high accuracy by suppressing the influence of sudden frame fluctuation when calculating the correction value of fixed pattern noise and it is possible to output a high-quality image at the time of image capture.

MODE FOR CARRYING OUT TEE INVENTION

Embodiments of the present invention will be described with reference to the drawings.

Outline of Embodiment

In the image correction method and the image capture device according to an embodiment of the present invention, an image signal at the time of light shielding is inputted. A one-frame addition average calculation unit calculates a one-frame addition average value for image data of one frame. A determination circuit determines whether or not the one-frame addition average value falls within a specific range. If the one-frame addition average value falls within the specific range, an adder adds the image data of one frame to a cumulative correction value stored in a frame memory, thereby updating the cumulative correction value. After updating the cumulative correction value a predetermined number of times, a divider calculates a value, which is obtained by dividing the cumulative correction value by the specified number of times for each pixel, as an FPN correction value. The subtracter subtracts the FPN correction value from the image data at the time of image capture to correct the image. Even if there is a sudden frame fluctuation, the image data of the frame is not added to the cumulative correction value. Therefore, it is possible to calculate the FPN correction value not affected by the frame fluctuation. This makes it possible to accurately correct fixed pattern noise and to output a high-quality image.

Furthermore, in the image correction method and the image capture device according to an embodiment of the present invention, image data of one frame at the time of light shielding is inputted and held in a frame memory. A one-frame addition average calculation unit calculates one-frame addition average value with respect to the image data of one frame. A first subtracter calculates a difference between the held image data of one frame and the one-frame addition average value. A first adder cumulatively adds the difference to calculate a cumulative difference value. An all-frame addition averaging unit calculates an addition average value of all one-frame addition average values as an all-frame addition average value. When the cumulative addition of differences is performed a specified number of times, a divider divides the cumulative difference value by the specified number of times. A second adder adds the division result and the all-frame addition average value to calculate a FPN correction value. A second subtracter subtracts the FPN correction value for each pixel from the image data at the time of image capture, thereby correcting the image. By calculating the difference between the one-frame addition average value and the image data for each frame, it is possible to absorb a sudden frame fluctuation and to reduce the influence of the frame fluctuation. This makes it possible to accurately correct fixed pattern noise and to output a high-quality image.

Figure 1:
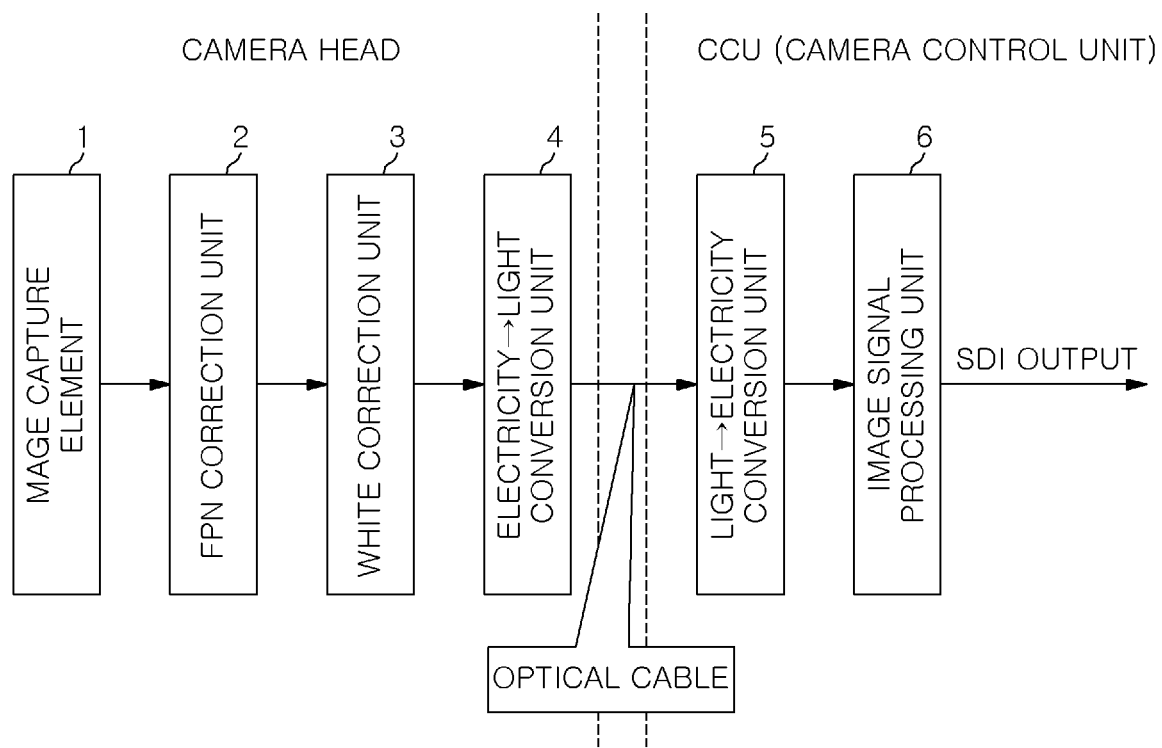
FIG. 1 is a schematic configuration block diagram of an image capture device according to an embodiment of the present invention.

(Configuration of Image Capture Device According to Embodiment: FIG. 1)

A schematic configuration of an image capture device according to an embodiment of the present invention will be described with reference to FIG. 1. FIG. 1 is a schematic configuration block diagram of an image capture device according to an embodiment of the present invention. The configuration of FIG. 1 is common to a first image capture device and a second image capture device which will be described later.

As shown in FIG. 1, an image correction method and an image capture device according to an embodiment of the present invention basically include a camera head for performing image capture and a CCU (Camera Control Unit) for performing signal processing.

The camera head is provided with an image capture element 1, an FPN correction unit 2, a white correction unit 3, and an electricity/light conversion unit (described as an electricity→light conversion unit in the figure) 4. The CCU is provided with a light/electricity conversion unit (described as a light→electricity conversion unit in the figure) 5 and an image signal processing unit 6.

The electricity/light conversion unit 4 of the camera head and the light/electricity conversion unit 5 of the CCU are connected by an optical cable.

The image capture element 1 of the camera head is a solid-state image capture element composed of CCD (Charge Coupled Device), CMOS (Complementary Metal Oxide Semiconductor) or the like. A plurality of pixels is arranged in a matrix shape in the image capture element 1. Each pixel generates an electric signal corresponding to the amount of received light.

The FPN correction unit 2 is a characteristic part of the present embodiment and performs image correction for removing fixed pattern noise (FPN) from an image signal.

The white correction unit 3 adjusts the white balance.

The electricity/light conversion unit 4 converts an electric signal into an optical signal, and outputs the optical signal to an optical cable.

The light/electricity conversion unit 5 converts the optical signal received from the optical cable into an electric signal. The image signal processing unit 6 performs signal processing accompanying image output to a SDI (Serial Digital Interface).

Hereinafter, the configuration and operation of the FPN correction unit 2 will be specifically described as a first embodiment and a second embodiment.

The image correction method and the image capture device according to the embodiment of the present invention are used for a broadcasting camera, a high-definition 8 k camera or the like and may also be applied to an ultra-high-definition image capture camera including high pixel elements.

Figure 2:
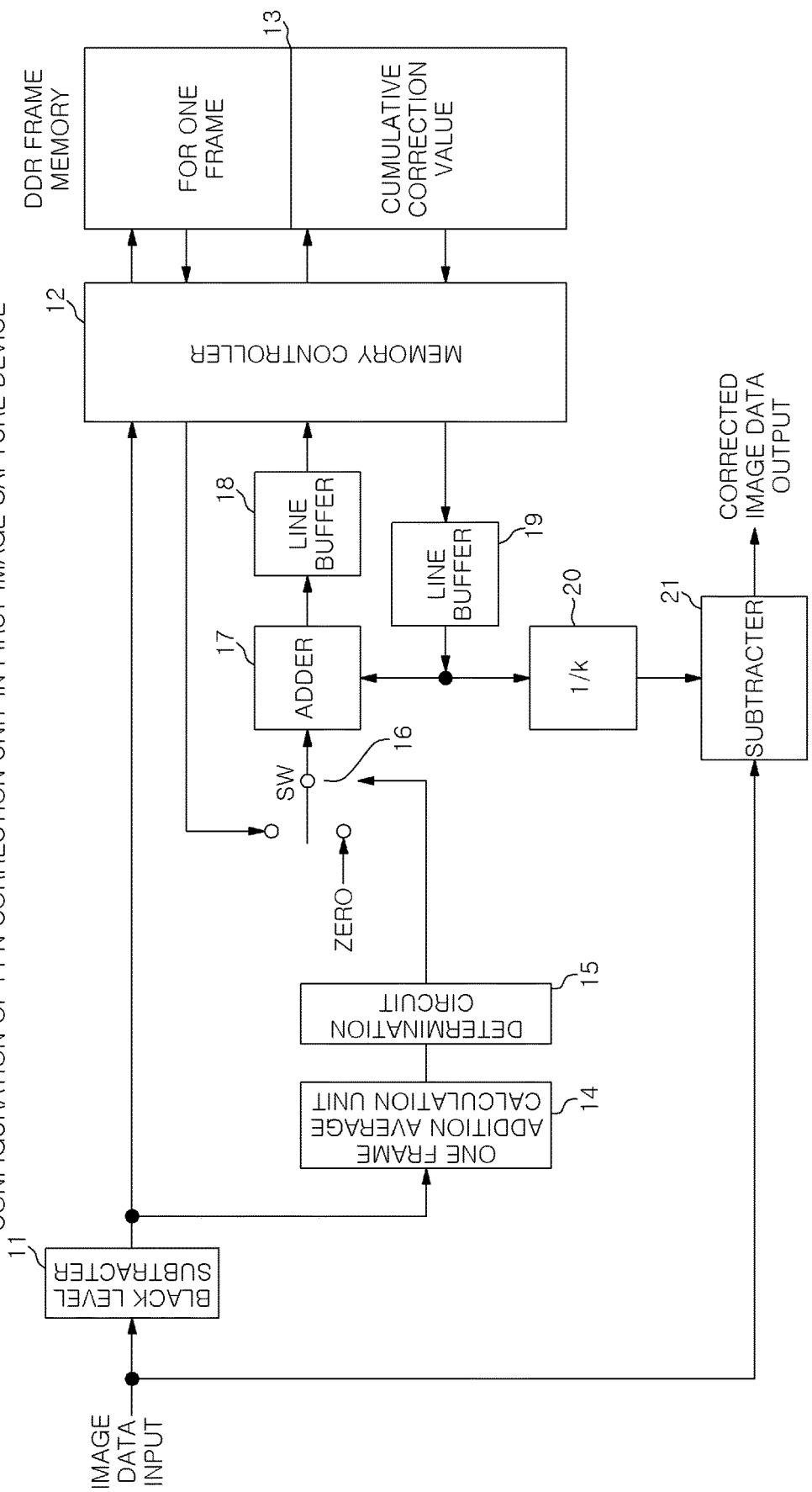
FIG. 2 is a configuration block diagram of an FPN correction unit of the image capture device according to the first embodiment of the present invention.

(Configuration of FPN Correction Unit in First Image Capture Device: FIG. 2)

The configuration of the image capture device (first image capture device) according to the first embodiment of the present invention will be described with reference to FIG. 2. FIG. 2 is a configuration block diagram of the FPN correction unit of the image capture device according to a first embodiment of the present invention.

The first image capture device calculates one-frame addition average value of the image data inputted at the time of light shielding and excludes a frame having a sudden fluctuation from the correction value calculation based on the one-frame addition average value. This makes it possible to calculate a high-quality correction value.

As shown in FIG. 2, the FPN correction unit of the first image capture device includes a black level subtracter 11, a memory controller 12, a DDR frame memory 13, a one-frame addition average calculation unit 14, a determination circuit 15, a switch 16, an adder 17, line buffers 18 and 19, a divider 20, and a subtracter 21.

The respective parts of the FPN correction unit in the first image capture device will be described.

The black level subtracter 11 subtracts a black reference level from the image signal at the time of light shielding in the correction value calculation processing for calculating the cumulative correction value which forms a base of the correction value of FPN correction. As a result, the reference of the FPN level is set to a digital value of zero.

The memory controller 12 controls the input/output of data to/from the DDR frame memory 13.

The DDR frame memory 13 stores image data and includes an area for storing image data for one frame at the time of light shielding, which is inputted from the black level subtracter 11 and an area for storing the cumulative correction value for one frame.

Further, the DDR frame memory 13 may include two memories, one for the input data and the other for the cumulative correction value.

The one-frame addition average calculation unit 14 calculates a one-frame addition average value by performing the addition average calculation of all the pixels with respect to the image data of one frame at the time of light shielding, which is outputted from the black level subtracter 11.

Specifically, the one-frame addition average calculation unit 14 cumulatively adds the inputted pixel data, adds data for one frame, and divides it by the total number of pixels to obtain one-frame addition average value of the frame.

When there is a sudden frame fluctuation, the one-frame addition average value of the frame is a value deviated from a one-frame addition average value of a normal frame.

In the switch 16, the image data of one frame from the DDR frame memory 13 is inputted to one of two input terminals and zero is inputted to the other input terminal. Based on the control from the determination circuit 15, the input to the adder 17 is switched to image data for one frame or zero.

When switched to zero, the image data for one frame inputted to one input terminal is not inputted to the adder 17 and is not used for calculation of the cumulative correction value.

The determination circuit 15 determines whether the image data of the frame is suitable as data for calculating the cumulative correction value which forms the basis of the FPN correction value, based on the one-frame addition average value.

Specifically, the determination circuit 15 stores a first threshold value which is a lower limit value defining an appropriate range of the one-frame addition average value and a second threshold value which is an upper limit value. The determination circuit 15 compares the one-frame addition average value from the one-frame addition average calculation unit 14 with the first threshold value and the second threshold value to determine whether or not the one-frame addition average value falls within the appropriate range.

Then, the determination circuit 15 switches the switch 16 according to the determination result. That is, if the one-frame addition average value falls within the appropriate range, the switch 16 is switched to the image data side (input side) for one frame. If the one-frame addition average value is outside the appropriate range, the switch 16 is switched to the zero side (non-input side). Switching of the switch 16 is performed at a high speed.

Furthermore, in the correction value calculation process, the determination circuit 15 holds the number of additions indicating how many frames of image data are added as the cumulative correction value. When the switch 16 is switched to the input side, the determination circuit 15 updates the cumulative correction value by adding 1 to the number of additions and continues to perform the correction value calculation process until the specified number of times is reached.

The adder 17 adds the cumulative correction value read from the DDR frame memory 13 and the output from the switch 16 for each pixel.

The line buffer 18 holds the output from the adder 17 for each row and outputs it to the memory controller 12 on a row-by-row basis.

The line buffer 19 holds the output for each row from the memory controller 12, and outputs the output to the adder 17 for each pixel.

The divider 20 divides the cumulative correction value read out from the DDR frame memory 13 by a predetermined number of additions (k times) for each pixel to calculate an average level of an image data at the time of light shielding. The divider 20 outputs the average level to the subtracter 21 as an FPN correction value for each pixel. The FPN correction value corresponds to the correction value recited in the claims.

After the correction value calculation process is completed, the subtracter 21 subtracts the FPN correction value from the divider 20 for each pixel from the image data input at the time of image capture, and outputs the corrected image data.

(Operation of First Image Capture Device: FIG. 2)

Next, the operation of the FPN correction unit of the first image capture device will be described with reference to FIG. 2.

In the first image capture device, first, a correction value calculation process for calculating a cumulative correction value is performed.

When the image data for one frame at the time of light shielding is inputted, the black level is subtracted by the black level subtracter 11 and is held in the DDR frame memory 13 via the memory controller 12. Then, the image data for one frame is inputted to one input terminal of the switch 16 via the memory controller 12.

Furthermore, the one-frame addition average calculation unit 14 calculates a one-frame addition average value with respect to the image data for one frame. The determination circuit 15 determines whether or not the one-frame addition average value falls within an appropriate range. According to the determination result, the switch 16 is switched as described above.

That is, when the determination circuit 15 determines that the one-frame addition average value of the inputted image data at the time of light shielding falls within the appropriate range, the image data of the frame stored in the DDR frame memory 13 is inputted to the adder 17 via the switch 16 and is added by the adder 17 to the cumulative correction value read from the DDR frame memory 13 and inputted to the adder 17 for each pixel. The addition result is stored in the DDR frame memory 13 as an updated cumulative correction value.

If it is determined that the one-frame addition average value is outside the appropriate range, zero is outputted from the switch 16 to the adder 17. The image data of the frame is discarded without being added to the cumulative correction value.

As a result, the image data for which the one-frame addition average value deviates from the appropriate range due to the frame fluctuation is not used for calculation of the cumulative correction value. This makes it possible to precisely calculate the correction value of fixed pattern noise.

Then, the FPN correction unit counts the number of additions indicating the number of frames added to the cumulative correction value in the determination circuit 15, and continues to perform the correction value calculation process by shielding light until the predetermined number of times is reached.

When the number of additions has reached the specified number of times, the correction value calculation process is terminated and the process is shifted to image capture. At this time, the actual image data at the time of image capture is corrected based on the cumulative correction value stored in the DDR frame memory 13.

The cumulative correction value read from the DDR frame memory 13 is inputted to the divider 20 and is divided by the specified number of times (k) for each pixel. The average level for each pixel at the time of light shielding is calculated as an FPN correction value.

When the image data at the time of image capture is inputted, the subtracter 21 subtracts the output (FPN correction value) of the divider 20 from the image data for each pixel. Thus, the fixed pattern noise is corrected and the corrected image data is outputted.

In this way, the operation in the first image capture device is performed.

Figure 3:
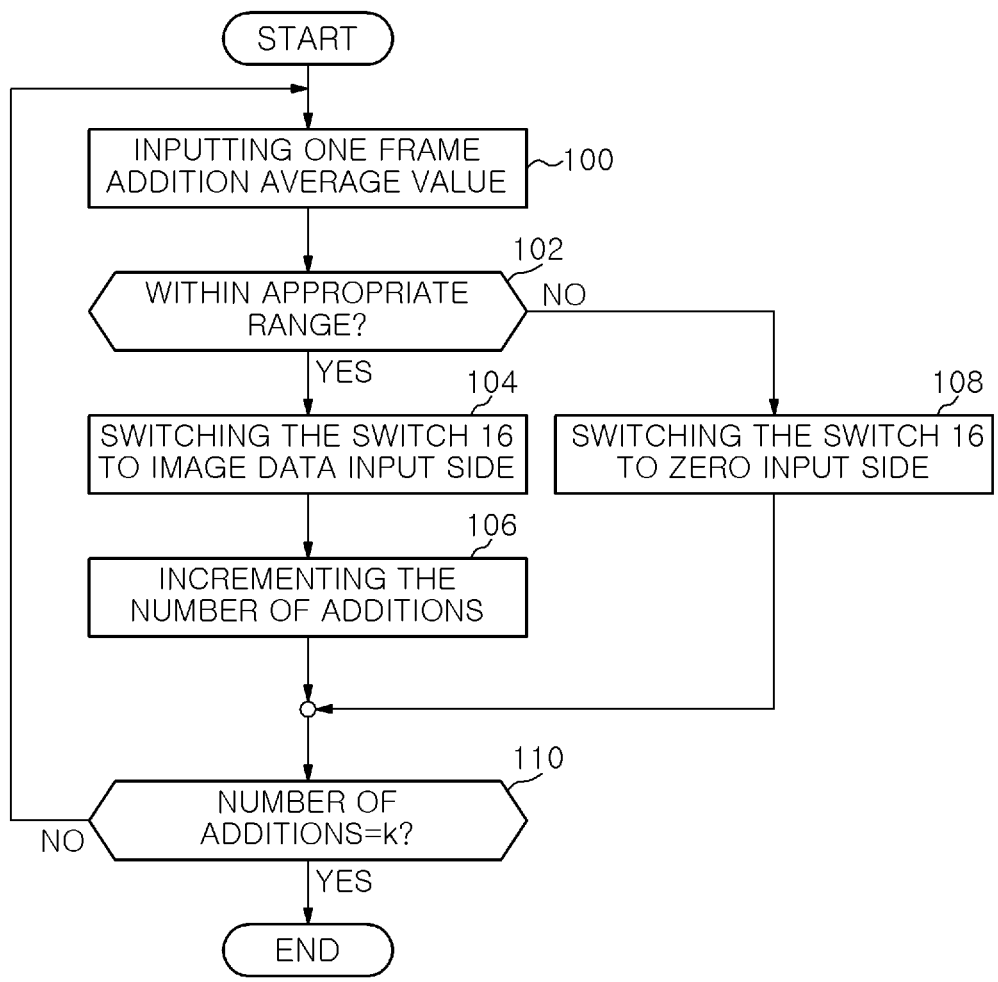
FIG. 3 is a flowchart showing the processing of a determination circuit 15 in a first image capture device.

(Processing of Determination Circuit 15: FIG. 3)

Next, the processing of the determination circuit 15 in the first image capture device will be described with reference to FIG. 3. FIG. 3 is a flowchart showing the processing of the determination circuit 15 in the first image capture device.

As shown in FIG. 3, the determination circuit 15 sets the number of additions to 0. When one-frame addition average value is inputted (100), the determination circuit 15 determines whether or not the one-frame addition average value is falls within the appropriate range equal to or larger than the first threshold value (lower limit value) and equal to or smaller than the second threshold value (upper limit value) (102).

If the one-frame addition average value falls within the appropriate range (if Yes) in process 102, the determination circuit 15 switches the switch 16 to one terminal side for inputting image data for one frame (104), whereby the number of additions is incremented (+1) (106), and the flow proceeds to process 110.

If the one-frame addition average value is outside the appropriate range (if No) in process 102, the determination circuit 15 switches the switch 16 to the other terminal side for inputting zero and the flow proceeds to process 110.

Then, the determination circuit 15 determines whether the number of additions has reached a specified number of times (k times) (whether the number of additions is equal to k). If the number of additions has not reached the specified number of times (if No), the flow returns to process 100 to repeat the processes. Further, if the number of additions reaches the specified number of times (if Yes), the determination circuit 15 terminates the processes.

In this way, the processing of the determination circuit 15 is performed.

Effect of the First Embodiment

According to the image correction method and the image capture device according to the first embodiment of the present invention, the image signal at the time of light shielding is inputted. The one-frame addition average calculation unit 14 calculates one-frame addition average value. If the one-frame addition average value falls within the appropriate range, the determination circuit 15 switches the switch 16 to input the image data for one frame to the adder 16. The image data for one frame is added to the cumulative correction value in the adder 17. The cumulative correction value is updated and stored in the DDR frame memory 13. If the one-frame addition average value is outside the appropriate range, the switch 16 is switched not to input the image data for one frame to the adder 16. After the update is performed until the update of the cumulative correction value reaches a specified number of times, the cumulative correction value stored in the DDR frame memory 13 is divided by the specified number of times to calculate the average level at the time of light shielding as the FPN correction value. The FPN correction value is subtracted from the image data inputted at the time of image capture, thereby correcting the image. The image data greatly deviated from usual one due to the sudden frame fluctuation is not used for calculation of the FPN correction value. Thus, there is an effect that it is possible to properly calculate the FPN correction value, to accurately correct the fixed pattern noise and to output a high-quality image.

Figure 4:
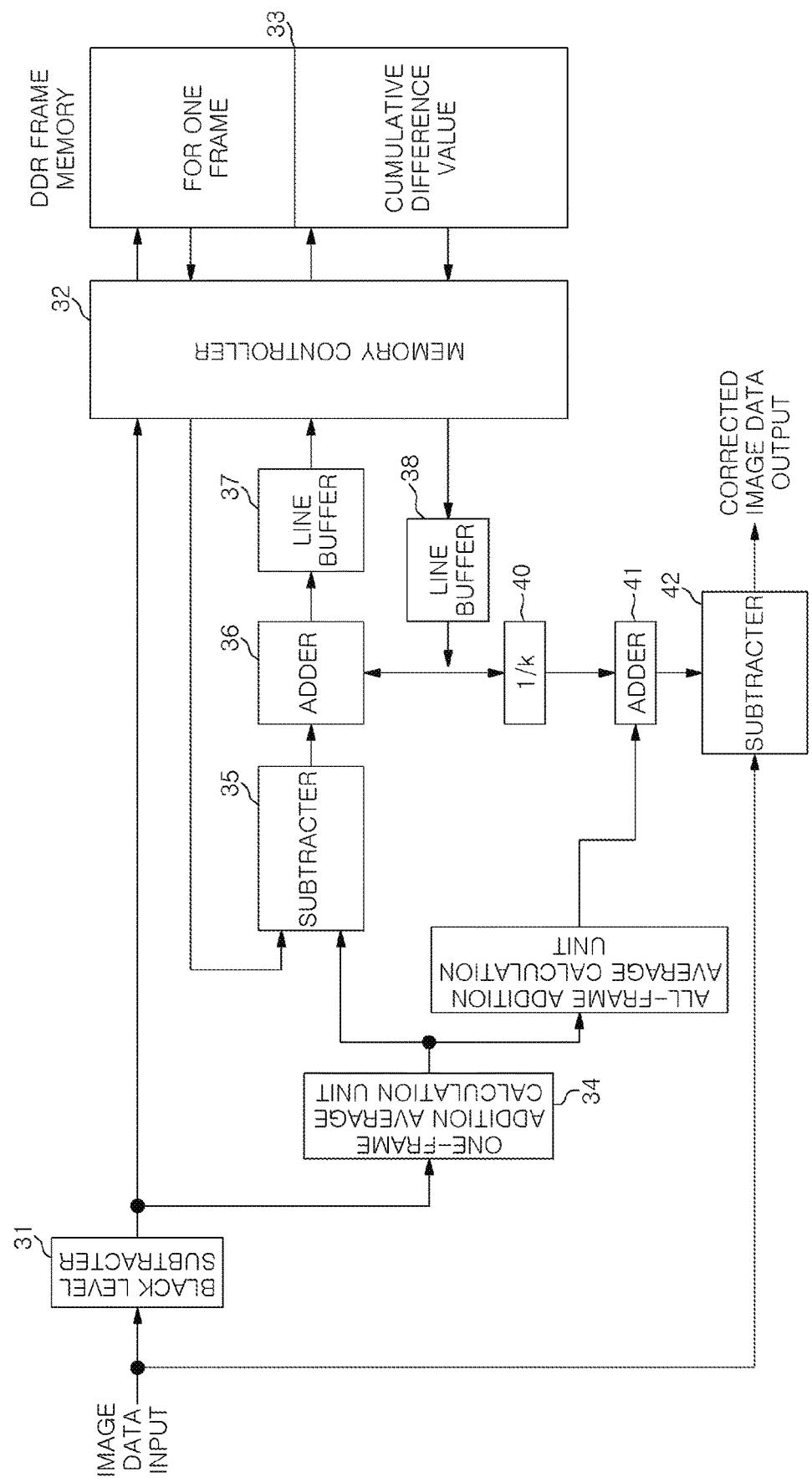
FIG. 4 is a configuration block diagram of an FPN correction unit of an image capture device according to a second embodiment of the present invention.
Figure 5:
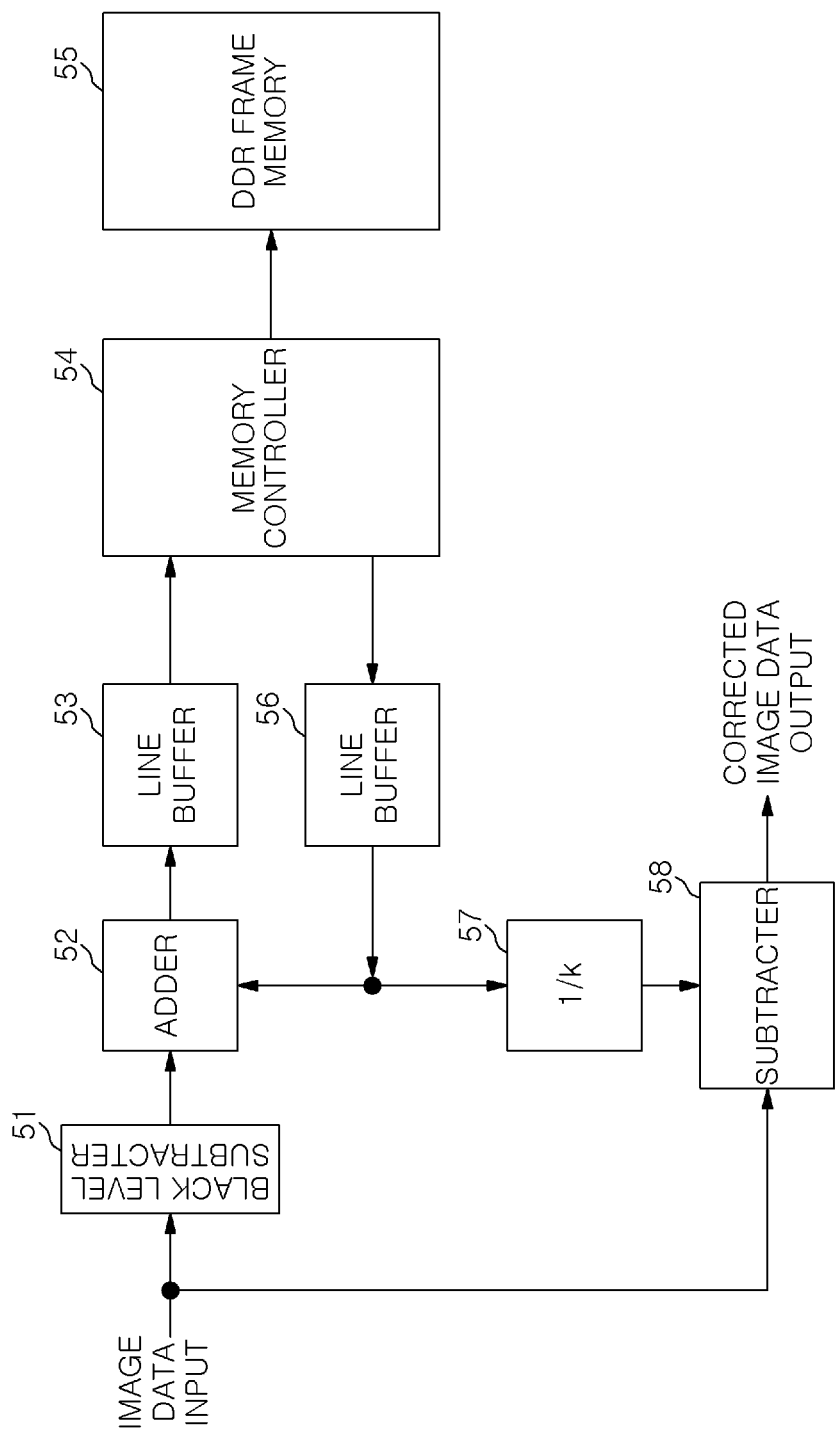
FIG. 5 is a configuration block diagram of an FPN correction unit in a conventional image capture device.

(Configuration of FPN Correction Unit in Second Image Capture Device: FIG. 4)

Next, the configuration of the image capture device (second image capture device) according to a second embodiment of the present invention will be described with reference to FIG. 4. In the second image capture device, with respect to the image data inputted at the time of light shielding, a difference between the one-frame addition average value and the image data in each frame is obtained for each pixel. Correction is performed by using the cumulative difference value obtained by accumulating the differences a specified number of times.

As a result, even if there is a sudden frame fluctuation, by taking the difference from the one-frame addition average value, it is possible to absorb a fluctuation in the frame and to smooth the fluctuation. This makes it possible to suppress the influence on the FPN correction value.

FIG. 4 is a configuration block diagram of the FPN correction unit of the image capture device according to the second embodiment of the present invention.

As shown in FIG. 4, the FPN correction unit of the second image capture device includes a black level subtracter 31, a memory controller 32, a DDR frame memory 33, a one-frame addition average calculation unit 34, a first subtracter 35, a first adder 36, line buffers 37 and 38, an all-frame addition average calculation unit 39, a divider 40, a second adder 41 and a second subtracter 42.

Among the above-described components, the black level subtracter 31, the one-frame addition average calculation unit 34 and the line buffers 37 and 38 are the same as those of the first image capture device and, therefore, will not be described.

The respective parts of the FPN correction unit in the second image capture device will be described.

The first subtracter 35 calculates a difference between the image data for one frame and the one-frame addition average value of the frame.

The first adder 36 adds the difference from the subtracter 35 to the cumulative difference value from the DDR frame memory 33. The added cumulative difference value is stored in the DDR frame memory 33.

The DDR frame memory 33 stores the image data for one frame and the cumulative difference value.

The memory controller 32 controls the input/output to/from the DDR frame memory 33. In the second image capture device, the number of additions at which the addition of the cumulative difference value is performed is counted. A correction value calculation process is performed until the number of additions reaches a specified number of times (k times).

In the first image capture device, if there is a frame in which the one-frame addition average value is outside the appropriate range, the frame is discarded. Therefore, the number of image data read at the time of light shielding is larger than k. However, in the second image capture device, upon reading k image data at the time of light blocking, the number of additions reaches the specified number of times. Thus, the correction value calculation process is terminated.

The all-frame addition average calculation unit 39 calculates an addition average of all the calculated one-frame addition average values as an all-frame addition average value. If the addition is performed a specified number of times (k times), an all-frame addition average value addition-averaged for k one-frame addition average values is calculated.

The divider 40 divides the cumulative difference value by the specified number of times k and calculates an average difference value for each pixel at the time of light shielding.

The second adder 41 adds the all-frame addition average value outputted from the all-frame addition average calculation unit 39 and the average difference value from the divider 40 to calculate an FPN correction value for each pixel which becomes an average level at the time of light shielding.

The second subtracter 42 subtracts the FPN correction value of the second adder 41 from the image data inputted at the time of image capture for each pixel, thereby correcting the image data and outputting the corrected image data.

(Operation of Second Image Capture Device: FIG. 4)

Next, the operation of the FPN correction unit of the second image capture device will be described with reference to FIG. 4.

In the correction value calculation process performed in the second image capture device, when the image data for one frame at the time of light shielding is inputted, the black level is subtracted by the black level subtracter 31 and is held in the DDR frame memory 33 via the memory controller 32. Then, the black level is inputted to the subtracter 35 via the memory controller 32 for each pixel.

In addition, with respect to the image data for one frame, a one-frame addition average value is calculated by the one-frame addition average calculation unit 34. The one-frame addition average value is branched into two values, one of which is inputted to the first subtracter 35.

In the first subtracter 35, a difference between the image data for one frame and the one-frame addition average value is calculated. In the first adder 36, the difference value for each pixel is outputted to the first adder 36 and is added to the cumulative difference value read from the DDR frame memory 33.

The added cumulative difference value is stored in the DDR frame memory 33 via the line buffer 37 and the memory controller 32, and the cumulative difference value is updated. Then, the number of additions is incremented (+1) by the memory controller 32.

If the number of additions reaches a specified number of times, the second image capture device terminates the correction value calculation process and proceeds to image capture.

The cumulative difference value stored in the DDR frame memory 33 is inputted to the divider 40 via the memory controller 32 and the line buffer 38 and is divided by the specified number of times k in the divider 40.

Further, the other of the branched one-frame addition average values is inputted to the all-frame addition average calculation unit 39, whereby an all-frame addition average value is calculated and inputted to the second adder 41.

In the second adder 41, the output from the divider 40 and the all-frame addition average value are added to generate an FPN correction value for each pixel. If the image data at the time of image capture is inputted, the FPN correction value generated by the second adder 41 is subtracted from the image data in the second subtracter 42. Thus, the image data in which the fixed pattern noise is corrected is outputted. In this manner, the operation of the second image capture device is performed.

Effect of Second Embodiment

According to the image correction method and the image capture device according to the second embodiment of the present invention, the image data for one frame at the time of light shielding is inputted and held in the DDR frame memory 33. The one-frame addition average calculation unit 34 calculates a one-frame addition average value with respect to the image data for one frame. The first subtracter calculates a difference between the held image data for one frame and the one-frame addition average value. The first adder cumulatively adds the differences to calculate a cumulative difference value. The all-frame addition average calculation unit calculates an addition average value of all the one-frame addition average values as an all-frame addition average Value. The memory controller 12 determines whether or not the cumulative addition of the differences in the adder 36 is performed a specified number of times. If the cumulative addition is performed the specified number of times or more, the divider 40 divides the cumulative difference value from the DDR frame memory 33 by the specified number of times. The second adder 41 adds the division result and the all-frame addition average value to calculate an FPN correction value for each pixel. If the image data at the time of image capture is inputted, the second subtracter 41 subtracts the FPN correction value from the inputted image data for each pixel. The fixed pattern noise is corrected so as to output the corrected image data. By calculating the difference between the one-frame addition average value and the image data for each frame, it is possible to absorb a sudden frame fluctuation and to reduce the influence of the frame fluctuation on the FPN correction value. This makes it possible to accurately correct the fixed pattern noise and to output a high-quality image.

INDUSTRIAL APPLICABILITY

The present invention is suitable for an image correction method and an image capture device capable of suppressing the influence of a sudden frame fluctuation at the time of calculating a correction value, removing fixed pattern noise with high accuracy, and obtaining a high-quality image. This application claims the benefit of priority based on Japanese Patent Application No. 2016-155897 filed on Aug. 8, 2016, the disclosure of which is incorporated herein by reference in its entirety.

EXPLANATION OF REFERENCE NUMERAL

1: image capture element
2: FPN correction unit
3: white correction unit
4: electricity/light conversion unit
5: light/electricity conversion unit
6: image signal processing unit
11, 31, 51: black level subtracter
12, 32, 54: memory controller
13, 33, 55: DDR frame memory
14, 34: one-frame addition average calculation unit
15: determination circuit
16: switch
17: adder
18, 19, 37, 38, 53, 56: line buffer
20, 40, 57: divider
21, 58: subtracter
35: first subtracter
36: first adder
39: all-frame addition average calculation unit
41: second adder
42: second subtracter

What is claimed is:

1. An image correction method performed in an image capture device, the method comprising:
inputting an image signal at the time of light shielding, holding image data for one frame and calculating a one-frame addition average value with respect to the image data;
subtracting the one-frame addition average value from the held image data to calculate a difference;
adding the difference and a cumulative difference value, updating the cumulative difference value and storing the updated cumulative difference value in a frame memory;
calculating an addition average of all the calculated one-frame addition average values for a specified number of times as an all-frame addition average value; and
after the update of the cumulative difference value is performed the specified number of times, adding a value obtained by dividing the cumulative difference value by the specified number of times to the all-frame addition average value to obtain a correction value, subtracting the correction value from image data inputted at the time of image capture and correcting an image.

2. An image capture device for correcting an image with respect to an inputted image signal, the device comprising:
- a frame memory configured to store image data for one frame at the time of light shielding and a cumulative correction value which is cumulatively added image data;
- a memory controller configured to control input/output to/from the frame memory;
- a one-frame addition average calculation unit configured to calculate a one-frame addition average value with respect to the image data for one frame;
- an adder configured to add the cumulative correction value and the image data for one frame;
- a switch configured to switch input/non-input of the image data for one frame to the adder;
- a determination circuit configured to perform a determination process of determining whether or not the one-frame addition average value falls within a preset range, switching the switch to an input side when the one-frame addition average value falls within the preset range, and switching the switch to an non-input side when the one-frame addition average value is outside the preset range;
- a divider configured to calculate a correction value by dividing the cumulative correction value by a specified number of times; and
- a subtracter configured to subtract the cumulative correction value from image data inputted at the time of image capture to correct an image,
- wherein the memory controller outputs the image data for one frame from the frame memory to the switch, outputs the cumulative correction value to the adder, updates the cumulative correction value stored in the frame memory using an addition result in the adder, performs the update of the cumulative correction value a specified number of times, and outputs the cumulative correction value to the divider.

3. The device of claim 2, wherein the determination circuit stores a first threshold value as a lower limit value of the one-frame addition average value and a second threshold value as an upper limit value of the one-frame addition average value, and determines that the one-frame addition average value falls within the preset range when the one-frame addition average value from the one-frame addition average calculation unit is equal to or larger than the first threshold value and equal to or smaller than the second threshold value.

4. An image capture device for correcting an image with respect to an inputted image signal, the device comprising:
- a frame memory configured to store image data for one frame at the time of light shielding and a cumulative correction value used for calculation of a correction value for correcting an image;
- a memory controller configured to control input/output to/from the frame memory;
- a one-frame addition average calculation unit configured to calculate a one-frame addition average value with respect to the image data for one frame;
- a first subtracter configured to subtract the one-frame addition average value from the image data for one frame;
- a first adder configured to add the cumulative difference value and a subtraction result in the first subtracter;
- a divider configured to divide the cumulative difference value by a specified number of times;
- an all-frame addition average calculation unit configured to calculate an addition average of the one-frame addition average values for the specified number of times as an all-frame addition average value;
- a second adder configured to add the all-frame addition average value and the division result of the divider; and
- a second subtracter configured to subtract the addition result of the second adder from image data inputted at the time of image capture to correct the image,
- wherein the memory controller outputs the image data for one frame from the frame memory to the first subtracter, outputs the cumulative difference value to the first adder, updates the cumulative difference value stored in the frame memory using the addition result in the first adder, performs the update of the cumulative difference value a specified number of times, and outputs the cumulative difference value to the divider.

* * * * *